United States Patent
Trainin et al.

(10) Patent No.: US 9,615,325 B2
(45) Date of Patent: *Apr. 4, 2017

(54) ACCESS POINT AND METHOD FOR AGGREGATE MPDU (A-MPDU) AND POWER-SAVE MULTI-POLL (PSMP) OPERATION

(71) Applicant: Intel Corporation, Santa Clara, CA (US)

(72) Inventors: Solomon B. Trainin, Haifa (IL); Oren Kaidar, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 14/166,731

(22) Filed: Jan. 28, 2014

(65) Prior Publication Data

US 2014/0204818 A1 Jul. 24, 2014

Related U.S. Application Data

(63) Continuation of application No. 13/362,239, filed on Jan. 31, 2012, now Pat. No. 8,654,748, which is a continuation of application No. 11/390,564, filed on Mar. 28, 2006, now Pat. No. 8,125,941.

(51) Int. Cl.
*H04W 4/00* (2009.01)
*H04W 52/02* (2009.01)
(Continued)

(52) U.S. Cl.
CPC ... *H04W 52/0206* (2013.01); *H04W 72/1268* (2013.01); *H04W 72/1278* (2013.01); *H04W 74/0825* (2013.01); *Y02B 60/50* (2013.01)

(58) Field of Classification Search
None
See application file for complete search history.

(56) References Cited

U.S. PATENT DOCUMENTS 6,977,944 B2 12/2005 Brockmann et al.
8,125,941 B2 2/2012 Trainin et al.
(Continued)

FOREIGN PATENT DOCUMENTS

WO WO-2007112227 A1 10/2007

OTHER PUBLICATIONS

"U.S. Appl. No. 11/390,564, Final Office Action mailed Apr. 28, 2011", 21 pgs.
(Continued)

*Primary Examiner* — Charles Appiah
*Assistant Examiner* — Alexander Yi
(74) *Attorney, Agent, or Firm* — Schwegman Lundberg & Woessner, P.A.

(57) ABSTRACT

Embodiments of wireless devices and methods for aggregate MPDU (A-MPDU) communications in an IEEE 802.11n network are generally described herein. Two or more A-MPDU subframes are aggregated to form an A-MPDU. In some embodiments, an access point (AP) that is configured for power-save multi-poll (PSMP) operation transmits a PSMP burst comprising a PSMP sequence of two or more A-MPDUs to a plurality of mobile stations (STA) during a downlink phase of the PSMP sequence. During PSMP operation, the AP is to receive a PSMP sequence of two or more A-MPDUs from the STAs during an uplink phase of the PSMP sequence.

25 Claims, 4 Drawing Sheets

(51) Int. Cl.
*H04W 72/12* (2009.01)
*H04W 74/08* (2009.01)

(56) References Cited

U.S. PATENT DOCUMENTS

| | | | |
|---|---|---|---|
| 2002/0049049 A1 | 4/2002 | Sandahl et al. | |
| 2003/0043744 A1 | 3/2003 | Lu et al. | |
| 2003/0133469 A1* | 7/2003 | Brockmann | H04L 5/1438 370/445 |
| 2003/0135640 A1* | 7/2003 | Ho | H04L 1/1621 709/237 |
| 2003/0214930 A1* | 11/2003 | Fischer | H04L 1/1614 370/338 |
| 2004/0190472 A1 | 9/2004 | Dunn et al. | |
| 2004/0203834 A1 | 10/2004 | Mahany | |
| 2005/0053170 A1 | 3/2005 | Catreux et al. | |
| 2005/0195858 A1 | 9/2005 | Nishibayashi et al. | |
| 2006/0092871 A1 | 5/2006 | Nishibayashi et al. | |
| 2006/0209667 A1 | 9/2006 | Li | |
| 2007/0161364 A1 | 7/2007 | Surineni et al. | |
| 2007/0171858 A1 | 7/2007 | Grandhi et al. | |
| 2007/0195813 A1 | 8/2007 | Lin | |
| 2007/0230408 A1 | 10/2007 | Trainin et al. | |
| 2008/0159205 A1 | 7/2008 | Sekiya et al. | |
| 2012/0127982 A1 | 5/2012 | Trainin et al. | |

OTHER PUBLICATIONS

"U.S. Appl. No. 11/390,564, Non Final Office Action mailed Apr. 30, 2009", 13 pgs.

"U.S. Appl. No. 11/390,564, Non Final Office Action mailed Sep. 17, 2010", 26 pgs.

"U.S. Appl. No. 11/390,564, Non Final Office Action mailed Oct. 7, 2008", 15 pgs.

"U.S. Appl. No. 11/390,564, Notice of Allowance mailed Oct. 19, 2011", 14 pgs.

"U.S. Appl. No. 11/390,564, Preliminary Amendment filed May 31, 2006", 10 pgs.

"U.S. Appl. No. 11/390,564, Response filed Jan. 6, 2009 to Non Final Office Action mailed Oct. 7, 2008", 15 pgs.

"U.S. Appl. No. 11/390,564, Response filed Feb. 15, 2011 to Non Final Office Action mailed Sep. 17, 2010", 11 pgs.

"U.S. Appl. No. 11/390,564, Response filed Jul. 23, 2009 to Non Final Office Action mailed Apr. 30, 2009", 11 pgs.

"U.S. Appl. No. 11/390,564, Response filed Jul. 27, 2011 to Final Office Action mailed Apr. 28, 2011", 11 pgs.

"U.S. Appl. No. 13/362,239, Corrected Notice of Allowance mailed Dec. 26, 2013", 11 pgs.

"U.S. Appl. No. 13/362,239, Final Office Action mailed May 23, 2013", 26 pgs.

"U.S. Appl. No. 13/362,239, Non Final Office Action mailed Jun. 25, 2012", 25 pgs.

"U.S. Appl. No. 13/362,239, Notice of Allowance mailed Oct. 4, 2013", 16 pgs.

"U.S. Appl. No. 13/362,239, Response filed Aug. 23, 2013 to Final Office Action mailed May 23, 2013", 9 pgs.

"U.S. Appl. No. 13/362,239, Response filed Sep. 20, 2012 to Non Final Office Action mailed Jun. 25, 2012", 10 pgs.

"International Application Serial No. PCT/US2007/064290, International Search Report mailed Aug. 30, 2007", 3 pgs.

"International Application Serial No. PCT/US2007/064290, Written Opinion mailed Aug. 3007", 5 pgs.

\* cited by examiner

BIDIRECTIONAL MULTIPLE RECEIVER AGGREGATE SEQUENCE

ALTERNATE DOWNLINK SEQUENCE

ACCESS POINT AND METHOD FOR AGGREGATE MPDU (A-MPDU) AND POWER-SAVE MULTI-POLL (PSMP) OPERATION

This application is a continuation of U.S. patent application Ser. No. 13/362,239, filed on Jan. 31, 2012, now issued as U.S. Pat. No. 8,654,748 which is a continuation of U.S. patent application Ser. No. 11/390,564, filed on Mar. 28, 2006, now issued as U.S. Pat. No. 8,125,941, all of which are incorporated herein by reference in their entireties.

TECHNICAL FIELD

Some embodiments of the present invention pertain to wireless communication networks. Some embodiments of the present invention relate to the communication of voice traffic over wireless networks.

BACKGROUND

The communication of multiple streams of voice traffic over packet-based wireless networks generally involves the communication of smaller packets with tighter latency requirements than the communication of other types of traffic, such as background and best-effort traffic. One issue with conventional wireless networks is that acknowledgements for frames of voice packets for each stream are performed outside of the burst sequence. This frame acknowledgement process consumes significant additional bandwidth, especially when several voice streams are being communicated by one access point or base station. As a consequence, the bandwidth available for other types of traffic is reduced.

Thus, there are general needs for systems and methods for the communication of multiple voice streams in a wireless network that utilize less bandwidth.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
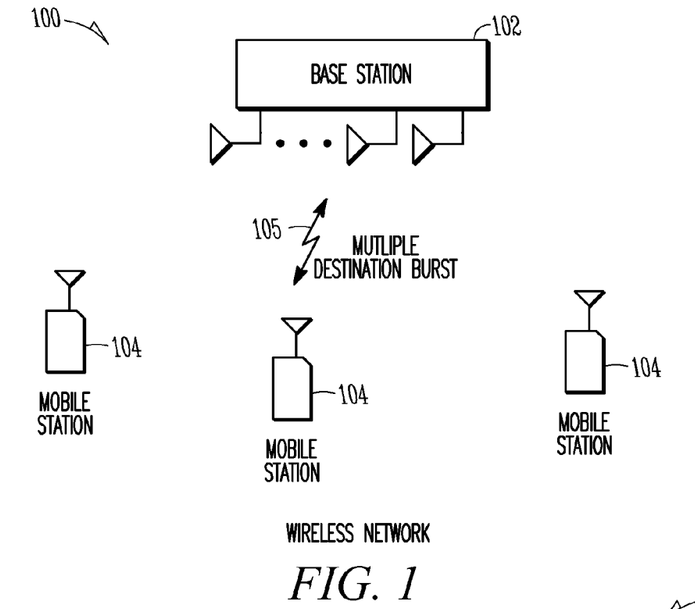
FIG. 1 illustrates a wireless network in accordance with some embodiments of the present invention.

FIG. 1 illustrates a wireless network in accordance with some embodiments of the present invention. Wireless network 100 includes base station 102 and one or more mobile stations 104. Base station 102 may associate with and communicate with each of mobile stations 104 allowing mobile stations 104 to communicate with other networks, such as the Internet, as well as to communicate with each other. Base station 102 and mobile stations 104 may be part of a base station service set (BSS) cell which uses one or more sets of frequency channels that may be selected so as not to interfere with the frequency channels used by other nearby base stations. In some embodiments, base station 102 and mobile stations 104 may be part of a BSS cell in accordance with the communication standards referenced below, although the scope of the invention is not limited in this respect.

In accordance with some embodiments of the present invention, base station 102 may communicate multiple streams of voice traffic with one or more of mobile stations 104 using a bidirectional multiple receiver aggregation (BMRA) sequence allowing multiple voice calls to be supported in parallel with other types of traffic, such as background and best effort traffic. The BMRA sequence may include multiple destination burst 105 for bi-directional communications with mobile stations 104. In these embodiments, the BMRA sequence includes a downlink sequence of data units individually addressed to one or more of mobile stations 104. The data units may include voice traffic aggregated with other traffic. The data units may also include a duration field to indicate the remaining transmission opportunity time remaining in the sequence. In these embodiments, the BMRA sequence may include an uplink sequence of data units with piggyback acknowledgements. The data units of both uplink and downlink sequences, as well as any acknowledge frames, may include a duration field to indicate the remaining transmission opportunity time remaining in the sequence. These embodiments are discussed in more detail below.

In accordance with some embodiments, to initiate the BMRA sequence, base station 102 may use a clear-to-send (CTS) to self transmission to help prevent collisions with a mapping frame, which may be used to indicate timing parameters associated with the BMRA sequence to mobile stations 104. These embodiments are also discussed in more detail below. In some embodiments, wireless network may be a wireless fidelity (WiFi) network and the BMRA sequence may be used to communicate time-sensitive applications, such as voice over wireless fidelity (VoWiFi) or video over WiFi, although the scope of the invention is not limited in this respect.

In some embodiments, the use of the BMRA sequence may allow the communication of multiple voice streams with decreased voice jitter. In some embodiments, the use of the BMRA sequence may allow increased bandwidth for other types of traffic, and may allow mobile stations 104 to reduce power consumption. These embodiments are also discussed in more detail below.

In some embodiments, base station 102 and mobile stations 104 may communicate orthogonal frequency division multiplexed (OFDM) communication signals over a multi-carrier communication channel. The multicarrier communication channel may be within a predetermined frequency spectrum and may comprise a plurality of orthogonal subcarriers. In some embodiments, the multicarrier signals may be defined by closely spaced OFDM subcarriers. Each subcarrier may have a null at substantially a center frequency of the other subcarriers and/or each subcarrier may have an integer number of cycles within a symbol period, although the scope of the invention is not limited in this respect. In some embodiments, base station 102 and mobile stations 104 may communicate using spread-spectrum signals, although the scope of the invention is not limited in this respect.

In some embodiments, base station 102 may be a communication station, such as wireless local area network (WLAN) communication station including a WiFi communication station, or an access point (AP). In some embodiments, each of mobile stations 104 may be a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, the frequency spectrums for the communication signals used by base station 102 and mobile stations 104 may comprise either a 5 gigahertz (GHz) frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some embodiments, the frequency spectrum for the communication signals may comprise frequencies between 2 and 11 GHz, although the scope of the invention is not limited in this respect.

In some embodiments, base station 102 and mobile stations 104 may communicate in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, although the scope of the invention is not limited in this respect as they may also be suitable to transmit and/or receive communications in accordance with other techniques and standards. Some embodiments may relate to the IEEE 802.11 Task Group N (TGn) proposal, and the home technology integration (HTI) specification. For more information with respect to the IEEE 802.11 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999" and related amendments/versions. Some embodiments relate to the IEEE 802.11e proposed enhancement to the IEEE 802.11 WLAN specification that will include quality-of-service (QoS) features, including the prioritization of data, voice, and video transmissions. In some embodiments, base station 102 and mobile stations 104 may use about a 20 megahertz (MHz) bandwidth, while in some high-throughput embodiments, about a 40 MHz bandwidth may be used. Other bandwidths may also be utilized by base station 102 and mobile stations 104.

Figure 2:
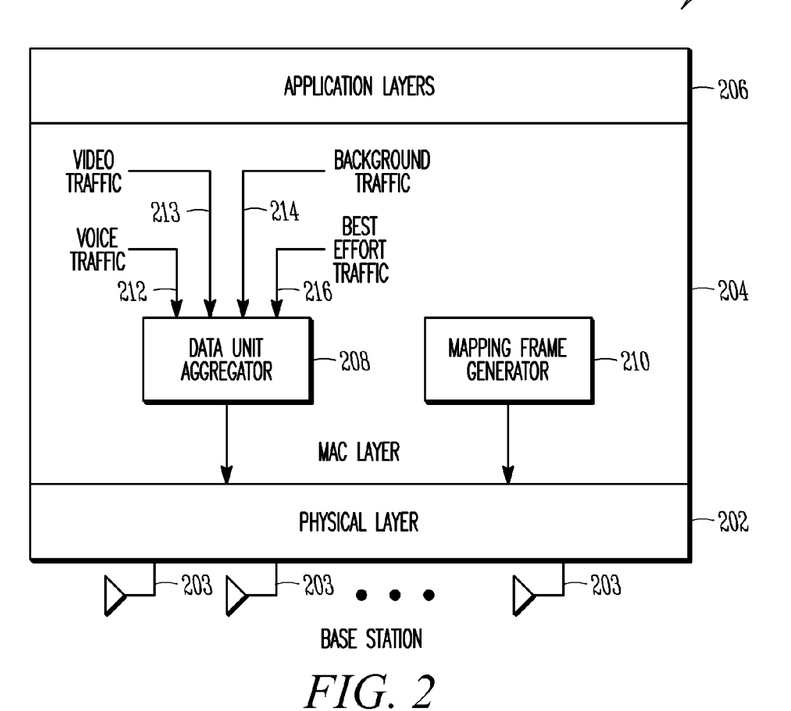
FIG. 2 is a block diagram of a base station in accordance with some embodiments of the present invention.

FIG. 2 is a block diagram of a base station in accordance with some embodiments of the present invention. Base station 200 may be suitable for use as base station 102 (FIG. 1) and may include physical layer 202, media-access control (MAC) layer 204, and one or more other layers including one or more application layers 206. Antennas 203 may be used to receive and/or transmit radio-frequency (RF) communication signals with mobile stations 104 (FIG. 1). Physical layer 202 may convert bit streams from MAC layer 204 to RF signals for transmission by antennas 203, and may convert received RF signals to bit streams for MAC layer 204. Application layer(s) 206 may provide traffic to and from one or more applications to MAC layer 204, including voice traffic 212, video traffic 213, background traffic 214 and/or best effort traffic 216.

In accordance with some embodiments, MAC layer 204 may include data unit aggregator 208 to aggregate traffic and generate data units, including aggregated data units, for the BMRA sequence. MAC layer 204 may also include mapping frame generator 210 to generate the mapping frame which may be used to indicate timing parameters associated with the BMRA sequence. The operations of physical layer 202 and MAC layer 204 are discussed in more detail below.

Although base station 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of base station 200 may refer to one or more processes operating on one or more processing elements.

Antennas 203 may comprise one or more directional or omnidirectional antennas, including, for example, dipole antennas, monopole antennas, patch antennas, loop antennas, microstrip antennas or other types of antennas suitable for transmission of RF signals. In some multiple-input, multiple-output (MIMO) embodiments, two or more antennas may be used. In some embodiments, instead of two or more antennas, a single antenna with multiple apertures may be used. In these embodiments, each aperture may be considered a separate antenna. In some embodiments, each antenna may be effectively separated to take advantage of spatial diversity and the different channel characteristics that may result between each of antennas 203 and another wireless communication device. In some embodiments, antennas 203 may be separated by up to 1/10 of a wavelength or more, although the scope of the invention is not limited in this respect.

Figure 3A:
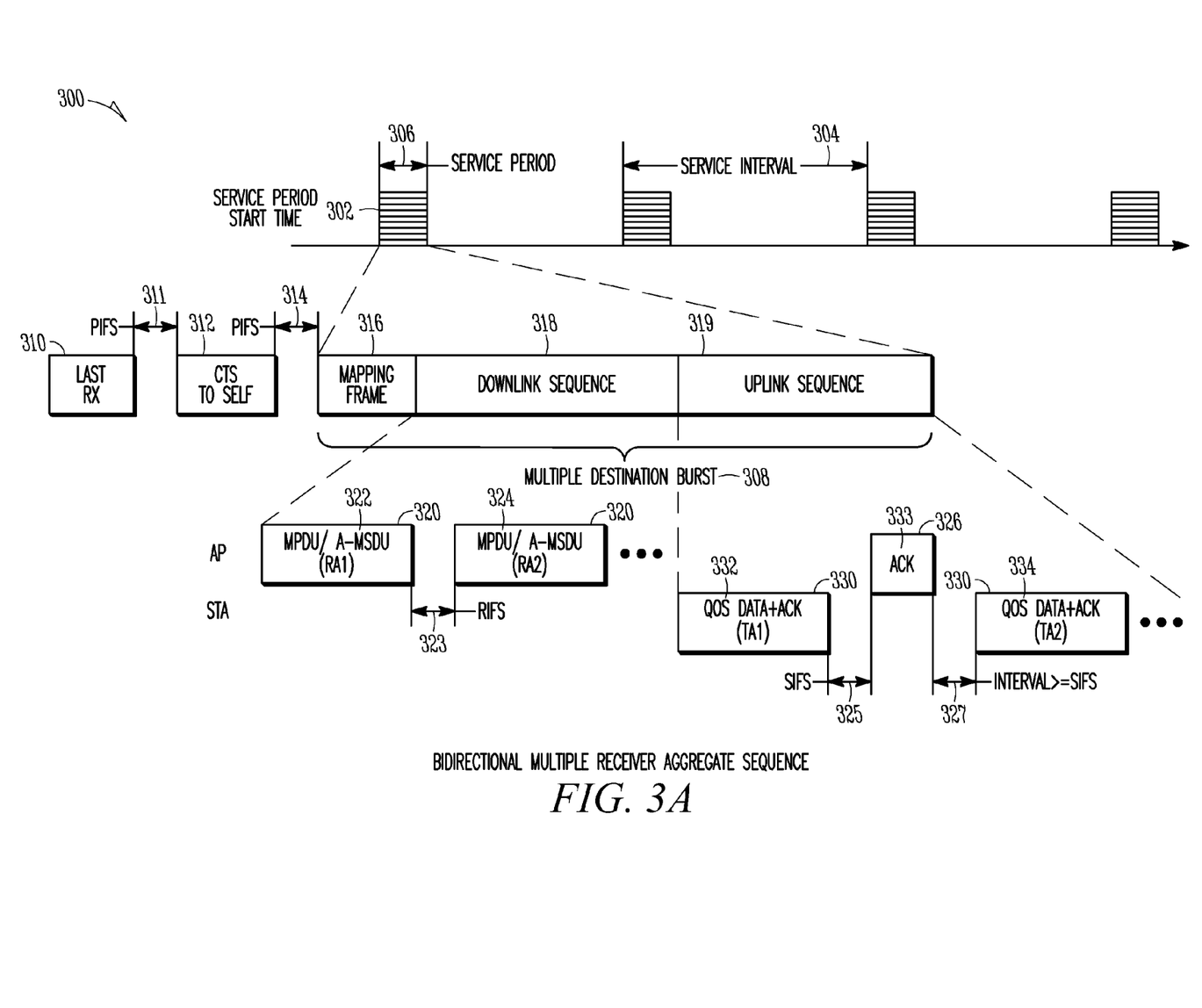
FIG. 3A illustrates a bidirectional multiple receiver aggregate (BMRA) sequence in accordance with some embodiments of the present invention.

FIG. 3A illustrates a bidirectional multiple receiver aggregate (BMRA) sequence in accordance with some embodiments of the present invention. BMRA sequence 300 may be used by a wireless communication device, such as base station 102 (FIG. 1) to communicate with multiple mobile stations, such as mobile stations 104 (FIG. 1). In some embodiments, BMRA sequence 300 may be used to communicate multiple voice streams along with other types of traffic. BMRA sequence 300 may include CTS to self transmission 312 and multiple destination burst 308. Multiple destination burst 308 may begin at service period start time 302, may be repeated every service interval 304, and may be communicated during service period 306 as illustrated. Multiple destination burst 308 may correspond to multiple destination burst 105 (FIG. 1).

Multiple destination burst 308 may include mapping frame 316 followed by downlink sequence 318 and uplink sequence 319. Downlink sequence 318 may include downlink aggregated data units 320 which may be transmitted by base station 102 (FIG. 1). Uplink sequence 319 may include uplink frames 330, which may be transmitted by individual mobile stations 104 (FIG. 1), and acknowledge (ACK) frames 326, which may be transmitted by base station 102 (FIG. 1). In some embodiments, mapping frame 316 may be either a multi-receiver multi-poll (MMP) mapping frame or a power-save multi-poll (PSMP) mapping frame, although the scope of the invention is not limited in these respects.

Referring to FIGS. 1, 2, and 3A, in some embodiments, the use of BMRA sequence 300 may provide for the communication of multiple streams of voice traffic 212 and/or video traffic 213 within a wireless network. As part of a multiple destination burst 308, aggregated voice traffic may be transmitted to a plurality of associated mobile stations 104, and acknowledge frames 326 may be transmitted to mobile stations within a sequence of uplink frames 330 that may be received from mobile stations 104 as part of multiple destination burst 308.

In some embodiments, mapping frame 316 may indicate to associated mobile stations 104 timing parameters associated with multiple destination burst 308. Downlink aggregated data units 320 may include aggregated data units of time-sensitive traffic such as voice traffic 212 and/or video traffic 213. Uplink frames 330 may be received from associated mobile stations 104 and may include a piggyback acknowledgement to acknowledge successful receipt of an associated one of downlink aggregated data units 320. Acknowledge frames 326 may be transmitted to each mobile station 104 after successful receipt of each uplink frame 330 prior to receipt of a next uplink frame 330. Acknowledgment frames 326 may acknowledge successful receipt of an associated uplink frame 330.

In some embodiments, downlink aggregated data units 320 may include best effort traffic 216 and/or background traffic 214 aggregated with voice traffic 212 and/or video traffic 213. Each of the downlink aggregated data units 320 may be associated with one of mobile stations 104. As illustrated in FIG. 3A, each downlink aggregated data unit 320 of downlink sequence 318 may have a receiver address (RA) associated with one of the mobile stations. For example, individual downlink aggregated data unit 322 may have a first receiver address (RA1) for a first mobile station, and individual downlink aggregated data unit 324 may have a second receive address (RA2) for a second mobile station. Additional downlink aggregated data units 320 for additional mobile stations 104 (FIG. 1) may also be included as part of downlink sequence 318.

Although downlink aggregated data units 320 are referred to as aggregated data units, the scope of the invention is not limited in this respect as there is no requirement that downlink aggregated data units 320 include aggregated frames. In some embodiments, downlink aggregated data units 320 may include voice traffic that is not aggregated with other traffic. In some embodiments, downlink aggregated data units 320 may include a MAC protocol data unit (MPDU), a MAC service data unit (MSDU), an aggregated MPDU (A-MPDU), an aggregated MSDU (A-MSDU), and/ or a MAC management protocol data unit (MMPDU), although the scope of the invention is not limited in this respect.

In some of these embodiments, multiple voice streams may be viewed as multiple calls that may be concurrently communicated with several associated mobile stations 104 along with other traffic. Each associated mobile station 104 may, for example, receive a separate voice stream from base station 102 allowing base station 102 to communicate multiple voice streams in parallel.

In some embodiments, mapping frame 316, downlink aggregated data units 320, uplink frames 330, and acknowledge frames 326 comprise the multiple destination burst 308. Prior to transmitting mapping frame 316, base station 102 may transmit CTS to self transmission 312 to help prevent collisions with the subsequently transmitted mapping frame 316. CTS to self transmission 312 may initialize and/or establish a network allocation vector (NAV) of receiving wireless communication devices. In some embodiments, CTS to self transmission 312 may also instruct associated mobile stations 104, as well as any other wireless communication devices within a BSS cell, to set their network allocation vector so that these wireless communication devices refrain from transmitting during mapping frame 316, although the scope of the invention is not limited in this respect. In these embodiments, CTS to self transmission 312 may be a frame that is transmitted by base station 102 to protect mapping frame 316 from collisions. Conventional request-to-send/clear-to-send (RTS/CTS) techniques may not be suitable for use with BMRA sequence 300 because multiple destination burst 308 may be a multicast transmission addressed to one or more mobile stations 104.

In some embodiments, the timing parameters within the mapping frame 316 may include downlink and uplink offsets with respect to a service start time 302 for an associated one of mobile stations 104. In accordance with some embodiments, downlink aggregated data units 320 may be transmitted at times indicated by mapping frame 316 and may be separated by reduced interframe spacing (RIFS) 323. Uplink frames 330 and their associated Acknowledge frames 326 may be separated by short interframe spacing (SIFS) 325, and Acknowledge frames 326 may be separated from next uplink frame 334 by at least SIFS 327, although the scope of the invention is not limited in this respect. Mapping frame 316 and the CTS to self transmission 312 may be separated by point coordination function (PCF) interframe spacing (PIFS) 314, although the scope of the invention is not limited in this respect. In some embodiments, PIFS 311 may separate last transmission (LAST RX) 310 from CTS to self transmission 312, although the scope of the invention is not limited in this respect.

In some embodiments, RIFS 323 may be a minimal amount of time to distinguish between sequent frames allowing an overhead burst within the downlink. In some embodiments, RIFS 323 may be about 2 microseconds (µS), although the scope of the invention is not limited in this respect. SIFS 325 may be a minimal time for transmissions between base station 102 and one of mobile stations 104 which may allow ACK frames 326 to be part of uplink sequence 319. PIFS 314 may be a minimal amount of time to allow physical layer 202 to sense the physical medium after CTS to self transmission 312 so that mapping frame 316 will not interfere with another frame that was already transmitted over the medium. In this way, base station 102 may avoid transmitting BMRA sequence 300 when it may result in a collision and is therefore wasted.

In some embodiments, uplink frames 330 may include QoS data and a piggyback ACK and may be addressed with a transmitter address (i.e., TA1, TA2) to indicate the address of the transmitter. In the example of FIG. 3A, TA1 may correspond to a first mobile station, and TA2 may correspond to a second mobile station. The QoS data may include voice traffic or other QoS data, although the scope of the invention is not limited in this respect as non-QoS data may be communicated in uplink frames 330 and/or management frames.

In some embodiments, downlink aggregated data units 320 and Acknowledge frames 326 may each include a duration field to indicate a remaining transmission opportunity (TxOp) time of multiple destination burst 308. The use of the duration field to indicate the remaining TxOp time may help prevent other wireless devices from transmitting during multiple destination burst 308, which may be particularly important when a wireless device did not receive the CTS to self transmission 312 and only receives an acknowledgement frame or a data frame.

In some power-saving embodiments, at least some of the associated mobile stations 104 may transition from a lower-power state to a higher-power state (i.e., wake up) at service period start time 302 to synchronize with and receive mapping frame 316. At least some of mobile stations 104 may return to the lower-power state (i.e., go to sleep) after processing mapping frame 316 until a time associated with receipt of one of aggregated data units 320 based on offsets indicated in mapping frame 316. In these embodiments, mobile stations 104 may return to a lower-power state until a time associated with a transmission of one of uplink frames 330 based on the offsets indicated in mapping frame 316. In these power-saving embodiments, the lower-power state may be viewed as a sleep mode, and the transition to the higher-power state may be viewed as waking up, although the scope of the invention is not limited in this respect. In these power-saving embodiments, a mobile station may sleep during portions of multiple destination burst 308 that are not relevant to the mobile station. For example, explain a second mobile station having receiving address RA2 may sleep during downlink aggregated data unit 322, may be awake during downlink aggregated data unit 324 to receive downlink aggregated data unit 324, and may sleep during subsequent downlink aggregated data units 320. In this example, the second mobile station may sleep during uplink data frame 332 and associated acknowledge frame 333, and may be awake during uplink data frame 334 and a subsequent acknowledge frame (not shown). In some of these power-saving embodiments, mapping frame 316 may be PSMP mapping frame, although the scope of the invention is not limited in this respect.

In some embodiments, frames of voice packets that were not successfully received during multiple destination burst 308 may be aggregated into downlink aggregated data units of a next multiple destination burst. In accordance with some embodiments, data unit aggregator 208 may generate downlink aggregated data units 320 and mapping frame generator 210 may generate mapping frame 316.

In some MIMO embodiments, multiple destination burst 308 may be transmitted using more than one of antennas 203. In these embodiments, each of antennas 203 may be weighted to compensate, at least in part, for channel characteristics with the associated mobile stations 104.

Figure 3B:
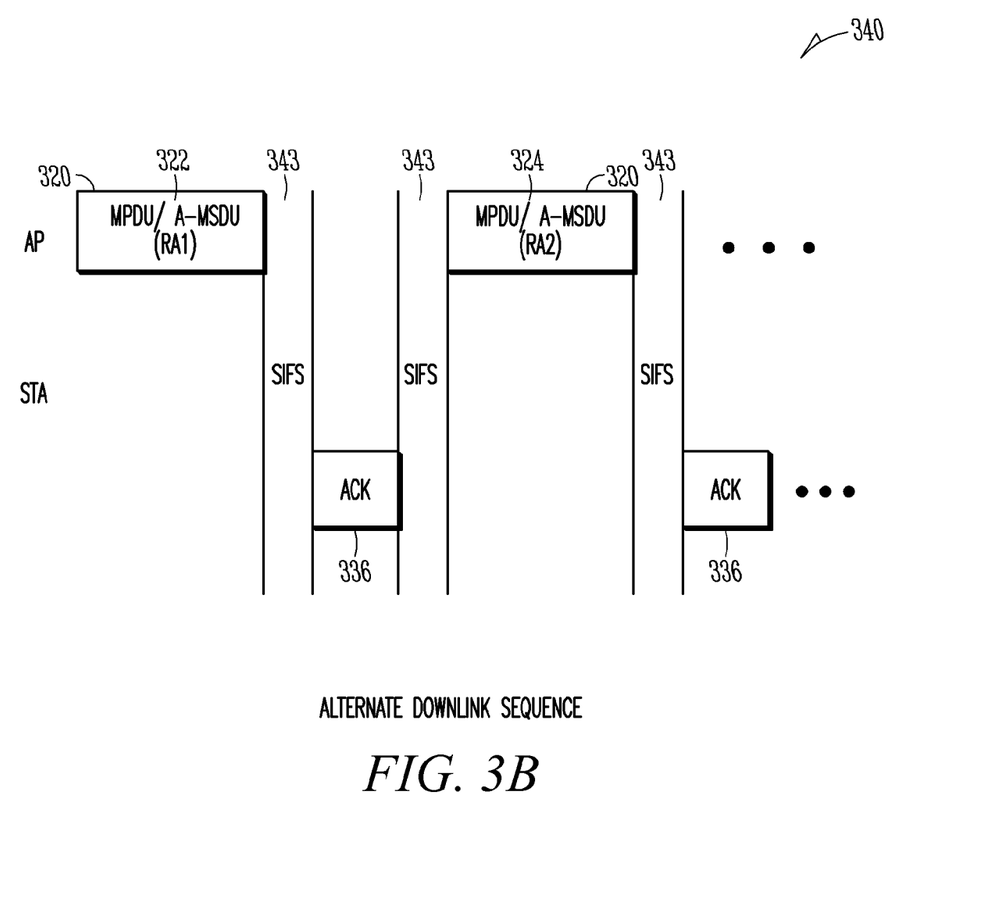
FIG. 3B illustrates a BMRA sequence with an alternate downlink sequence in accordance with some embodiments of the present invention.

FIG. 3B illustrates a BMRA sequence with an alternate downlink sequence in accordance with some embodiments of the present invention. In these embodiments, alternate downlink sequence 340 may be used instead of downlink sequence 318 (FIG. 3A). Alternate downlink sequence 340 includes downlink aggregated data units 320, shown as downlink aggregated data unit 322 and downlink aggregated data unit 324. In FIG. 3B, downlink aggregated data unit 322 and downlink aggregated data unit 324 may correspond respectively to downlink aggregated data unit 322 (FIG. 3A) and downlink aggregated data unit 324 (FIG. 3A). Alternate downlink sequence 340 includes ACK frames 336, which may be transmitted by a mobile station and may immediately follow each downlink aggregated data unit 320 as illustrated. In these embodiments, SIFS 343 may separate ACK frames 336 from downlink aggregated data units 322 and 324, although the scope of the invention is not limited in this respect.

In some of these embodiments, ACK frames 336 may acknowledge all or part of the data in the prior downlink aggregated data unit 320. In embodiments when ACK frames 336 acknowledge all of data in a prior of downlink aggregated data units 320, uplink frames 330 (FIG. 3A) do not need to include a piggyback acknowledgement. In embodiments when ACK frames 336 acknowledge part of the data in a prior of downlink aggregated data units 320, uplink frames 330 (FIG. 3A) may include a piggyback acknowledgement to acknowledge the remaining data. When downlink aggregated data units 320 includes voice traffic, video traffic or other time-sensitive traffic, ACK frames 336 may be included in the downlink sequence to immediately acknowledge at least the portions of downlink aggregated data units 320 that include the voice traffic, video traffic and/or other time-sensitive traffic. In some of these embodiments, mapping frame 316 (FIG. 3A) may indicate whether alternate downlink sequence 340 is to be used instead of downlink sequence 318 (FIG. 3A).

Figure 4:
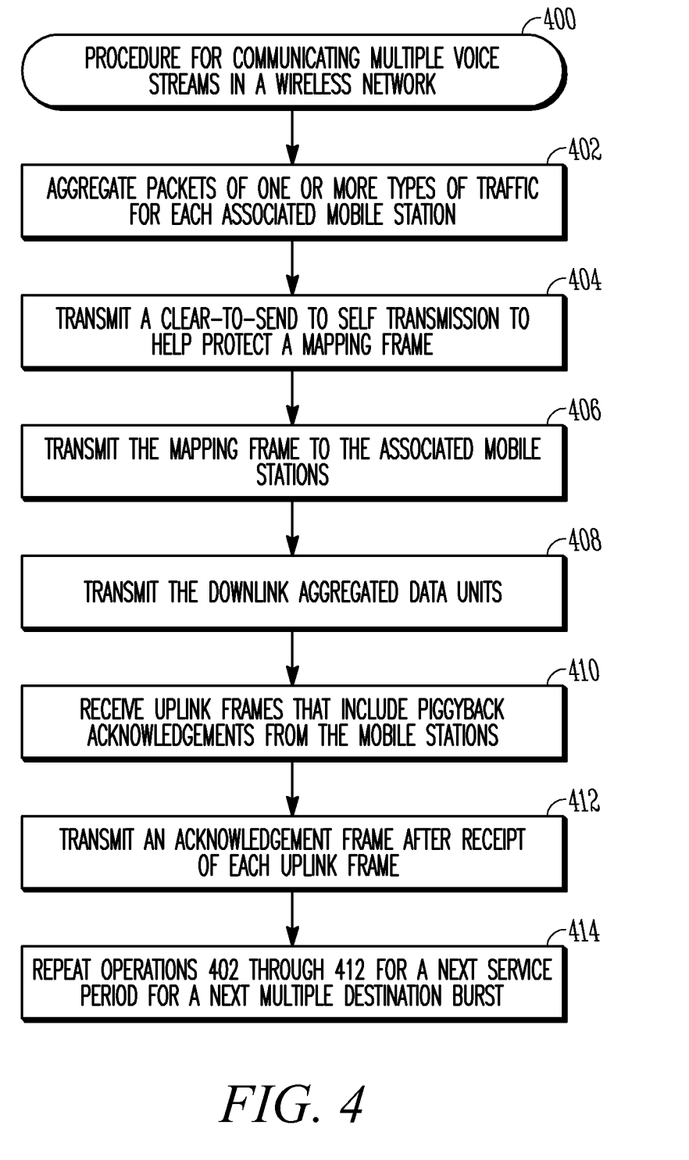
FIG. 4 is a flow chart of a procedure for communicating multiple voice streams in a wireless network in accordance with some embodiments of the present invention.

FIG. 4 is a flow chart of a procedure for communicating multiple voice streams in a wireless network in accordance with some embodiments of the present invention. Procedure 400 may be performed by a wireless communication device, such as base station 102 (FIG. 1), to communicate with one or more mobile stations, such as mobile stations 104 (FIG. 1).

Operation 402 comprises aggregating packets of one or more types of traffic for each associated mobile station. Operation 402 may be performed by data unit aggregator 208 (FIG. 2) and may generate downlink aggregated data units, such as downlink aggregated data units 320 (FIG. 3A). The downlink aggregated data units may include voice traffic aggregated with other types of traffic, although the scope of the invention is not limited in this respect.

Operation 404 comprises transmitting a CTS to self transmission to help protect a mapping frame. The CTS to self transmission may correspond to CTS to self transmission 312 (FIG. 3A).

Operation 406 comprises transmitting a mapping frame to the associated mobile stations. The mapping frame may correspond to mapping frame 316 (FIG. 3A).

Operation 408 comprises transmitting the downlink aggregated data units that may have been aggregated in operation 402. In some embodiments, operation 408 may comprise transmitting downlink aggregated data units 320 (FIG. 3A or FIG. 3B). In some embodiments, operation 408 may also comprise receiving immediate acknowledgements, such as ACK frames 336 (FIG. 3B), to acknowledge part of the data in a prior downlink aggregated data unit.

Operation 410 comprises receiving uplink frames that include piggyback acknowledgements from the mobile stations. The uplink frames may correspond to uplink frames 330 (FIG. 3A).

Operation 412 comprises transmitting an acknowledgement frame after receipt of each uplink frame. The acknowledge frames may be transmitted amongst the sequence of uplink frames and may correspond to acknowledge frames 326 (FIG. 3A). Operations 406 through 412 comprise communicating a multiple destination burst, such as multiple destination burst 308 (FIG. 3A).

Operation 414 comprises repeating operations 402 through 412 for a next service period for a next multiple destination burst. For example, operations 402 through 412 may be repeated for next service interval 304 (FIG. 3A).

Although the individual operations of procedure 400 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. An apparatus of an access point (AP), the apparatus comprising memory; and
logic circuitry coupled to the memory, the logic circuitry configured to:
generate a power-save multi-poll (PSMP) frame as part of a PSMP sequence, the PSMP frame comprising a first mapping; configure aggregated MAC protocol data units (A-MPDUs) for transmission as part of the PSMP sequence,
the PSMP sequence configurable to include both group-addressed frames and individually addressed frames to two or more scheduled mobile stations; configure the AP to transmit the A-MPDUs during a downlink phase of the PSMP sequence;
decode during an uplink phase of the PSMP sequence, uplink A-MPDUs sequentially from the two or more scheduled mobile stations in accordance with the first mapping, each received uplink A-MPDU including at least an acknowledgement; and
configure the AP to transmit a second mapping when an acknowledgement is not received from one or more of the scheduled mobile stations during the uplink phase, the second mapping for the one or more mobile stations for which the acknowledgement was not received.

2. The apparatus of claim 1 wherein the logic circuitry is further configured to decode uplink A-MPDUs in accordance with the second mapping.

3. The apparatus of claim 1 wherein the logic circuitry is configured to decode the uplink A-MPDUs from each scheduled mobile station during the uplink phase without the scheduled mobile station having to perform a clear-channel assessment procedure.

4. The apparatus of claim 3 wherein the logic circuit is configured to obtain a transmission opportunity (TXOP) for the PSMP sequence,
wherein the receipt of the uplink A-MPDUs occurs during the TXOP.

5. The apparatus of claim 4 wherein the PSMP frame is transmitted after a point coordination function (PCF) interframe spacing (PIFS) when an acknowledgement is expected to be received but had not yet been received from one of the scheduled mobile stations during the uplink phase.

6. The apparatus of claim 5 wherein the logic circuitry is further configured to transmit the first mapping prior to the downlink phase, the first mapping to indicate the mapping.

7. The apparatus of claim 6 wherein the PSMP sequence is further configured to include A-MPDUs with multiple traffic identifiers, and
wherein the logic circuitry further configures the AP to transmit an additional A-MPDU that includes a multi-traffic-ID block acknowledgement to acknowledge uplink data as part of an additional PSMP sequence that is part of a PSMP burst.

8. The apparatus of claim 6 wherein after the uplink phase, the apparatus configures the AP to transit an additional PSMP sequence for resource allocation and error recovery.

9. A method performed by an apparatus of an access point (AP), the method comprising:
generating a power-save multi-poll (PSMP) frame as part of a PSMP sequence, the PSMP frame comprising a first mapping;
configuring aggregated medium access control (MAC) protocol data units (A-MPDUs) for transmission as part of the PSMP sequence, the PSMP sequence configurable to include both group-addressed frames and individually addressed frames to two or more scheduled mobile stations;
configuring the AP to transmit the A-MPDUs during a downlink phase of the PSMP sequence;
decoding during an uplink phase of the PSMP sequence, uplink A-MPDUs sequentially from the two or more scheduled mobile stations in accordance with the first mapping, each received uplink A-MPDU including at least an acknowledgement; and configuring the AP to transmit a second mapping frame when an acknowledgement is not received from one or more of the scheduled mobile stations during the uplink phase, the second mapping of the one or more mobile stations for which the acknowledgement was not received.

10. The method of claim 9 further comprising decoding uplink A-MPDUs in accordance with the second mapping.

11. The method of claim 10 further comprising decoding the uplink A-MPDUs from each scheduled mobile station during the uplink phase without the scheduled mobile station having to perform a clear-channel assessment procedure.

12. The method of claim 11 further comprising obtaining a transmission opportunity (TXOP) for the PSMP sequence, wherein the receipt of the uplink A-MPDUs occurs during the TXOP.

13. The method of claim 12 wherein the PSMP frame is to be transmitted after a point coordination function (PCF) interframe spacing (PIFS) when an acknowledgement is expected to be received but had not yet been received from one of the scheduled mobile stations during the uplink phase.

14. The method of claim 13 further comprising configuring the AP to transmit the first mapping prior to the downlink phase, the first mapping to indicate the mapping.

15. The method of claim 14 wherein the PSMP sequence is further configured include A-MPDUs with multiple traffic identifiers, and
wherein the method further comprises configuring the AP to transmit an additional A-MPDU that includes a multi-traffic-ID block acknowledgement to acknowledge uplink data as part of an additional PSMP sequence that is part of a PSMP burst.

16. The method of claim 14 wherein after the uplink phase, the AP is configured to transit an additional PSMP sequence for resource allocation and error recovery.

17. A non-transitory computer-readable storage medium that stores instructions for execution by one or more processors,
the instructions to configure the one or more processors to cause an apparatus of an access point (AP) to:
generate a power-save multi-poll (PSMP) frame as part of a PSMP sequence, the PSMP frame comprising a first mapping;
configure aggregated medium access control (MAC) protocol data units (A-MPDUs) for transmission as part of the PSMP sequence,
the PSMP sequence configurable to include both group-addressed frames and individually addressed frames to two or more scheduled mobile stations; configure the AP to transmit the A-MPDUs during a downlink phase of the PSMP sequence; and
decode during an uplink phase of the PSMP sequence, uplink A-MPDUs sequentially from the two or more scheduled mobile stations in accordance with the first mapping, each received uplink A-MPDU including at least an acknowledgement;
configure the AP to transmit a second mapping when an acknowledgement is not received from one or more of the scheduled mobile stations during the uplink phase, the second mapping for the one or more mobile stations for which the acknowledgement was not received.

18. The non-transitory computer-readable storage medium of claim 17 wherein the instructions further configure the one or more processors to cause the apparatus to:
configure the AP to transmit a second mapping when an acknowledgement is not received from one or more of the scheduled mobile stations during the uplink phase, the second mapping for the one or more mobile stations for which the acknowledgement was not received;
decode uplink A-MPDUs in accordance with the second mapping.

19. The non-transitory computer-readable storage medium of claim 18 wherein the instructions configure the one or more processors to cause the apparatus to receive the uplink A-MPDUs from each scheduled mobile station during the uplink phase without the scheduled mobile station having to perform a clear-channel assessment procedure.

20. The non-transitory computer-readable storage medium of claim 19 wherein the instructions configure the one or more processors to cause the apparatus to obtain a transmission opportunity (TXOP) for the PSMP sequence, wherein the receipt of the uplink A-MPDUs occurs during the TXOP.

21. The non-transitory computer-readable storage medium of claim 20 wherein the PSMP frame is transmitted after a point coordination function (PCF) interframe spacing (PIFS) when an acknowledgement is expected to be received but had not yet been received from one of the scheduled mobile stations during the uplink phase.

22. The non-transitory computer-readable storage medium of claim 19 wherein the instructions further configure the one or more processors to cause the apparatus to configure the AP to transmit the first mapping prior to the downlink phase, the first mapping to indicate the mapping.

23. The non-transitory computer-readable storage medium of claim 22 wherein the PSMP sequence is further configured to include A-MPDUs with multiple traffic identifiers, and wherein the instructions further configure the one or more processors to cause the apparatus to transmit an additional A-MPDU that includes a multi-traffic-ID block acknowledgement to acknowledge uplink data as part of an additional PSMP sequence that is part of a PSMP burst.

24. The non-transitory computer-readable storage medium of claim 22 wherein the instructions further configure the one or more processors to cause the apparatus to configure the AP to transit an additional PSMP sequence after the uplink phase for resource allocation and error recovery.

25. The apparatus of claim 1 wherein the apparatus is to generate the PSMP sequence to include one or more packet protocol data units (PPDUs).

* * * * *

UNITED STATES PATENT AND TRADEMARK OFFICE
CERTIFICATE OF CORRECTION

PATENT NO. : 9,615,325 B2
APPLICATION NO. : 14/166731
DATED : April 4, 2017
INVENTOR(S) : Trainin et al.

It is certified that error appears in the above-identified patent and that said Letters Patent is hereby corrected as shown below:

On the Title Page

On page 2, in Column 2, under "Other Publications", Line 32, delete "Aug. 3007"," and insert --Aug. 30, 2007",-- therefor In the Claims In Column 10, Line 24, in Claim 4, delete "circuit" and insert --circuitry-- therefor Signed and Sealed this
Fourteenth Day of April, 2020

Andrei Iancu
*Director of the United States Patent and Trademark Office*